US009109964B2

(12) United States Patent
Bao et al.

(10) Patent No.: US 9,109,964 B2
(45) Date of Patent: Aug. 18, 2015

(54) PRESSURE DETECTION DEVICE AND POLISHING APPARATUS

(75) Inventors: Yan-Cheng Bao, Shenzhen (CN); Ai-Jun Tang, Shenzhen (CN); Cheng Zhang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 526 days.

(21) Appl. No.: 13/446,241

(22) Filed: Apr. 13, 2012

(65) Prior Publication Data

US 2013/0084784 A1     Apr. 4, 2013

(30) Foreign Application Priority Data

Sep. 30, 2011    (CN) .......................... 2011 1 0297226

(51) Int. Cl.
*G01L 5/00* (2006.01)
*B24B 49/16* (2006.01)

(52) U.S. Cl.
CPC .............. *G01L 5/0076* (2013.01); *B24B 49/16* (2013.01)

(58) Field of Classification Search
CPC .............................. G01L 5/0076; B24B 49/16
USPC .......................... 451/5, 8, 10, 11; 73/862.641
See application file for complete search history.

(56) References Cited

U.S. PATENT DOCUMENTS

| 3,019,564 | A | * | 2/1962 | Haracz .......................... 451/160 |
| 3,939,610 | A | * | 2/1976 | Suzuki et al. ................. 451/160 |
| 4,268,999 | A | * | 5/1981 | Noto et al. ......................... 451/5 |
| 5,456,627 | A | * | 10/1995 | Jackson et al. .................. 451/11 |
| 5,833,519 | A | * | 11/1998 | Moore ............................ 451/56 |
| 5,853,491 | A | * | 12/1998 | Schulz .............................. 134/2 |
| 6,123,607 | A | * | 9/2000 | Ravkin et al. .................... 451/56 |
| 6,293,853 | B1 | * | 9/2001 | Perlov et al. .................... 451/56 |
| 6,767,427 | B2 | * | 7/2004 | Walters et al. ............ 156/345.12 |
| 6,969,305 | B2 | * | 11/2005 | Kimura et al. .................. 451/41 |
| 2002/0026827 | A1 | * | 3/2002 | Fong et al. ....................... 73/161 |
| 2003/0176149 | A1 | * | 9/2003 | Yoshida et al. ................. 451/10 |
| 2007/0270081 | A1 | * | 11/2007 | Crocco et al. ...................... 451/5 |
| 2010/0311309 | A1 | * | 12/2010 | Shinozaki ......................... 451/5 |

FOREIGN PATENT DOCUMENTS

| FR | 2626670 A1 | * | 8/1989 | .............. G01B 5/30 |
| JP | 6-335715 A | | 12/1994 | |
| JP | 06335715 A | * | 12/1994 | ............. B21B 28/04 |
| JP | 2001-191237 A | | 7/2001 | |

* cited by examiner

*Primary Examiner* — Lee D Wilson
*Assistant Examiner* — Tyrone V Hall, Jr.
(74) *Attorney, Agent, or Firm* — Novak Druce Connolly Bove + Quigg LLP

(57) ABSTRACT

A pressure detection device includes a pressure detector, a bearing member, at least two guiding rods passing through the bearing member and connecting with the pressure detector, at least two elastic elements sleeving on the at least one guiding rod and resisting between the bearing member and the pressure detector for transferring forces from the bearing member to the pressure detector.

7 Claims, 3 Drawing Sheets

PRESSURE DETECTION DEVICE AND POLISHING APPARATUS

BACKGROUND

1. Technical Field

The present disclosure relates to pressure detection devices, and particularly, to a pressure detection device used in a polishing apparatus.

2. Description of Related Art

Manual adjustment is one way used to adjust lengths of elastic members for adjusting pressures of polishing apparatuses used for polishing workpieces. However, even when polishing a workpiece, different pressures need to be applied on different portions of the workpiece. In related arts, operators usually adjust compressed lengths of elastic members according to their feeling and experience. Therefore, the accuracy of manual adjustment is low and it is hard to achieve quality in the polishing process.

Therefore, there is room for improvement within the art.

DETAILED DESCRIPTION

Figure 1:
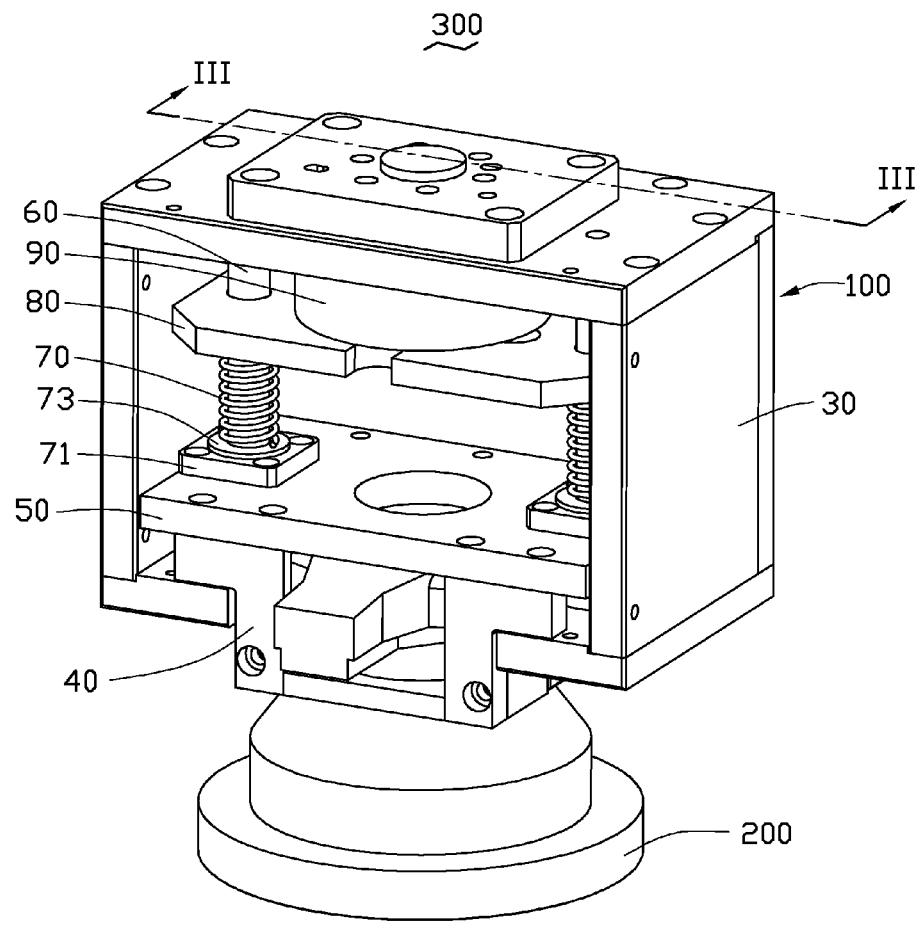
FIG. 1 is an isometric view of a polishing apparatus according to an embodiment of the present disclosure.

FIG. 1 shows a polishing apparatus 300 including a pressure detection device 100 and a polisher 200. The pressure detection device 100 is positioned on the polisher 200 for detecting a pressure of the polisher 200 on a workpiece (not shown). The polishing apparatus 300 contains other functional mechanisms and components which are not shown and not described here.

The pressure detection device 100 includes a housing 30, a loading base 40, a bearing member 50, a pair of guiding rods 60, a pair of elastic elements 70, a force transfer member 80 and a pressure detector 90. The bearing member 50, the guiding rods 60, the elastic elements 70, the force transfer member 80 and the pressure detector 90 are positioned and received in the housing 30. The loading base 40 is detachably installed in the housing 30 and extends out to connect with the polisher 200. The bearing member 50 is positioned on the loading base 40 and away from the polisher 200. The pair of the guiding rods 60 extend through the bearing member 50, allowing movement of the bearing member 50 along the pair of the guiding rods 60. The pair of the elastic elements 70 accompanying the force transfer member 80 movably sleeve on the guiding rods 60 and resist between the bearing member 50 and the force transfer member 80. The pressure detector 90 is mounted on the force transfer member 80 and fixed to a top of the housing 30. The two elastic elements 70 transfer the pressure of the bearing member 50 to the pressure detector 90. The pressure detector 90 detects the pressure which the polisher 200 applies to the workpiece.

Figure 2:
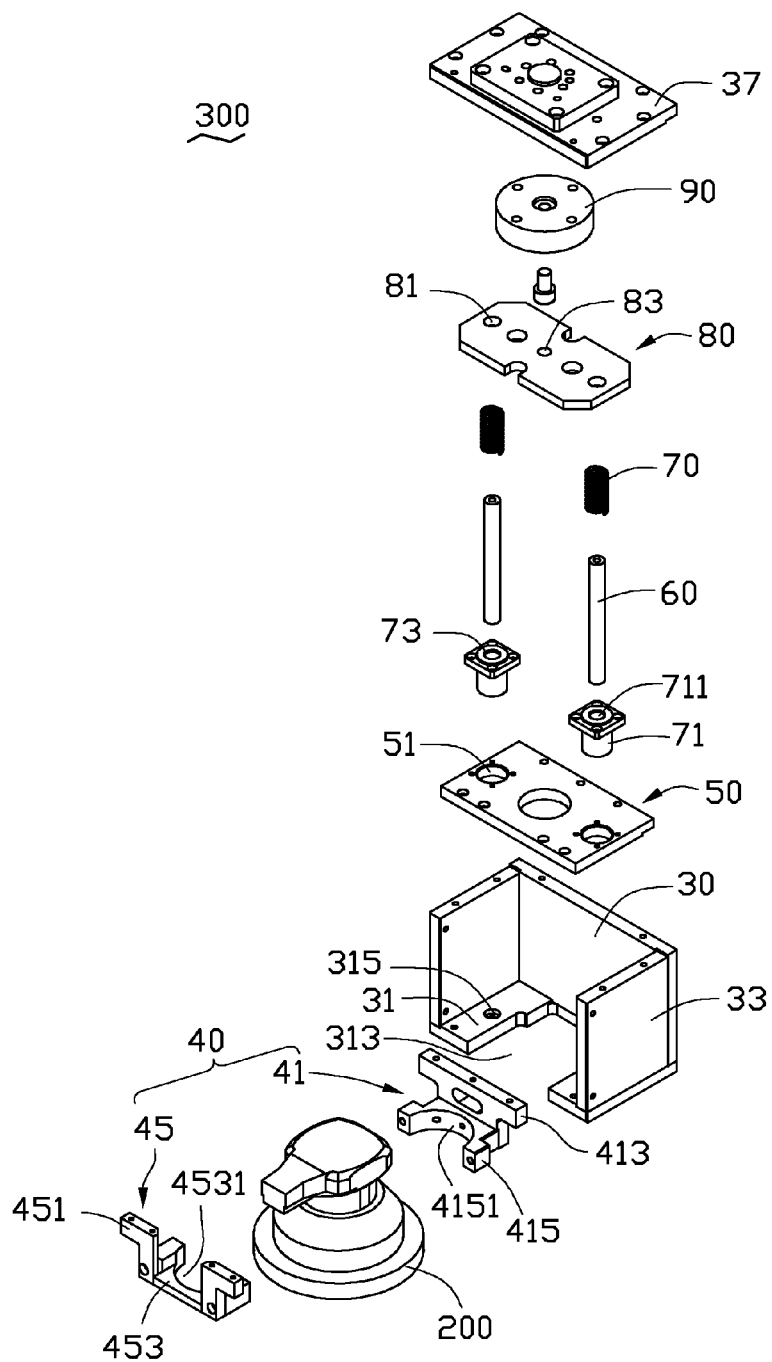
FIG. 2 is an isometric and exploded view of the polishing apparatus of FIG. 1.
Figure 3:
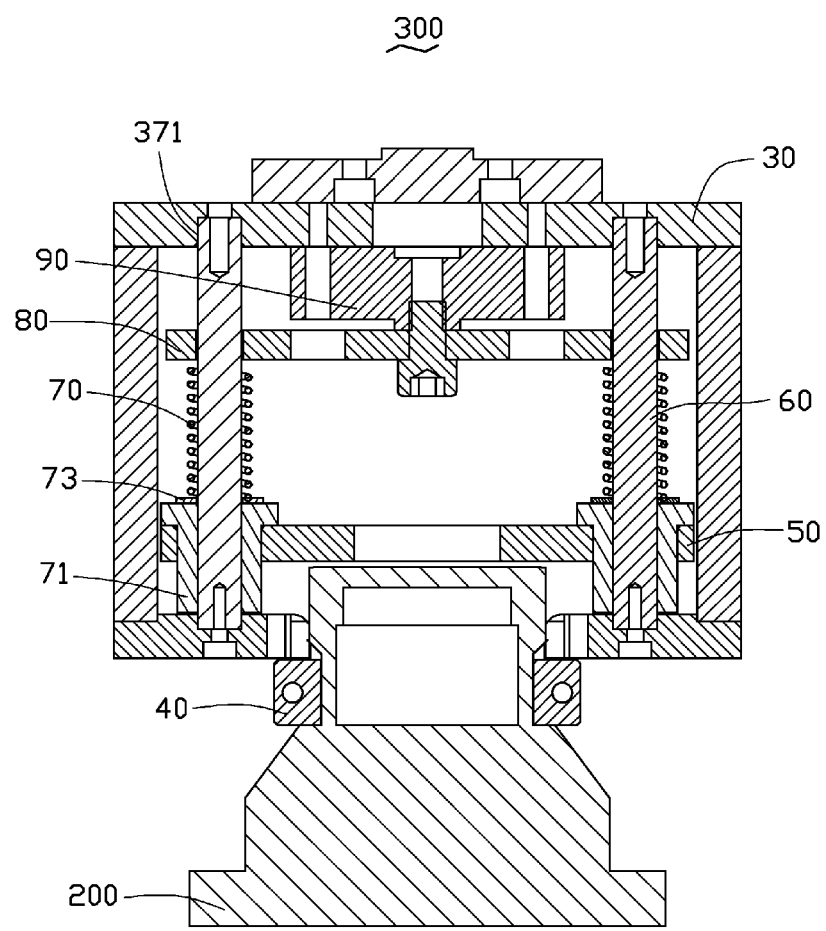
FIG. 3 is a cross section of the polishing apparatus of FIG. 1, taken along line III-III.

Referring also to FIGS. 2 and 3, the housing 30 is a substantially rectangular box, which includes a bottom board 31, a sidewall 33, and a top board 37 opposite to the bottom board 31. A U-shaped mounting hole 313 is defined at a middle of the bottom board 31 for installing the loading base 40. Two installing holes 315 positioning the two guiding rods 60 are defined at two opposite side portions of the bottom board 31 adjacent to the mounting hole 313. The sidewall 33 is a substantially U-shaped structure connected the bottom board 31 and the top board 37. Two connecting holes 371 corresponding to the two installing holes 315 are defined in the top board 37.

The loading base 40 passes through the mounting hole 313 and resists the bottom board 31. The loading base 40 has one end thereof extending beyond the housing 30 and assembled with the polisher 200. The loading base 40 includes a first loading member 41 and a second loading member 45 opposite to the first loading member 41. The first loading member 41 includes a first resisting portion 413 and a first clamping portion 415 extending perpendicularly from a bottom portion of the first resisting portion 413. The first resisting portion 413 resists against the bottom board 31. A first clamping port 4151 is defined in the first clamping portion 415. The first clamping port 4151 is substantially half circular. The first clamping portion 415 extends out of the mounting hole 313 of the housing 30. The second loading member 45 includes a second resisting portion 451 and a second clamping portion 453 detachably connecting with the second resisting portion 451. The second resisting portion 451 resists against the bottom board 31. A second clamping port 4531 is defined at the second clamping portion 415. The second clamping port 4531 is substantially half circular. The second clamping portion 453 extends out of the mounting hole 313. The first clamping port 4151 and the second clamping port 4531 cooperatively form a clamping space for installing the polisher 200. In other embodiments, the first loading member 41 and the second loading member 45 of the loading base 40 can be integrally formed.

The bearing member 50 is received in the housing 30 and connected with end surfaces of the first resisting portion 413 and the second resisting portion 451 away from the clamping space. The bearing member 50 is a substantially planar board. Two first through holes 51 are defined symmetrically at two opposite ends of the bearing member 50.

The pair of guiding rods 60 are respectively passing through the two first through holes 51 of the bearing member 50 and positioned between the bottom board 31 and the top board 37. In other embodiments, the two guiding rods 60 are sandwiched between the top board 37 and the bottom board 31; the number of the guiding rod 60 can be three, four or more.

The pair of elastic elements 70 movably sleeve on corresponding guiding rods 60, the force transfer member 80 also movably sleeve on the two guiding rods 60 above the pair of elastic elements 70. In other embodiments, the number of the elastic elements 70 can be three, four or more. Two second through holes 81 corresponding to the two guiding rods 60 are defined in opposite ends of the force transfer member 80. The force transfer member 80 is a substantially planar board. The two elastic elements 70 are located between the bearing member 50 and the force transfer member 80 for transferring the force from the workpiece. In the illustrated embodiment, the force transfer member 80 is a thin and light planar board with great resilience, a diameter of each second through holes 81 is larger than that of each guiding rod 60 avoiding a contact between the guiding rods 60 and the force transfer member 80. A fastening hole 83 is defined at a middle of the force transfer member 80 and between the two second through holes 81. The pressure detector 90 is mounted between the force transfer member 80 and the top board 37. In an alternative embodiment, the force transfer member 80, the top board 37 can be omitted, the pressure detector 90 sleeves on the two guiding rods 60.

The pressure detection device 100 further includes two buffering elements 71 and two washers 73 respectively positioned on the two buffering elements 71. Each buffering element 71 is positioned in each first through hole 51. The two buffering elements 71 are used for guiding the guiding rods 60, reducing abrasion or torque between the guiding rod 60 and the bearing member 50. Each guiding rod 60 passes through a corresponding washer 73 and a corresponding buffering element 71. Each washer 73 resists between the corresponding elastic element 70 and the force transfer member 80.

In assembly, the first and second resisting portions 413, 451 of the loading base 40 pass through the mounting hole 313 and abutted against the bottom board 31. The bearing member 50 is connected the end surfaces of the first and second resisting portions 413, 451. The two buffering elements 71 are respectively positioned in the two first through holes 51, and the two washers 73 are respectively put on the two buffering elements 71. Each guiding rod 60 passes through the corresponding washer 73, the corresponding buffering element 71 and finally goes into a corresponding installing hole 315 to connect with the bottom board 31. The elastic elements 70 respectively sleeve on the two guiding rods 60. The sidewall 33 is assembled with the bottom board 31. The pressure detector 90, the top board 37 and the force transfer member 80 are assembled together. The top board 37, the force transfer member 80 and the pressure detector 90 are placed above the two guiding rods 60 away from the bottom board 31. One end of each of the guiding rods 60 away from the bearing member 50 passes through the force transfer member 80 and is installed in a corresponding connecting hole 371 of the top board 37. Then each elastic element 70 resists between the corresponding washer 73 and the force transfer member 80. Finally, the polisher 200 is clamped in the clamping space of the loading base 40.

When the polishing apparatus 300 works, the polisher 200 applies a polishing pressure perpendicular to the workpiece. The workpiece will produce a counterforce to the polisher 200 with a same value in a reverse direction. The counterforce is transferred to the bearing member 50 by the loading base 40. The bearing member 50 is driven to move toward the top board 37 along the two guiding rods 60. The two elastic elements 71 are compressed. The pressure detector 90 detects a force perpendicularly to the force transfer member 80 equal to the counterforce.

The two elastic elements 70 respectively sleeve on the guiding rods 60 and resist between the force transfer member 80 and the bearing member 50. Then the elastic element 70 is not easy to be distorted. The buffering members 73 are positioned in the first through holes 51 to reduce the abrasion and torque between the guiding rods 60 and the bearing member 50. That, the pressure detector 90 exactly detects the force perpendicularly to the force transfer member 80. The force is equal to the counterforce of the workpiece applied to the polisher 200. In addition, the first loading member 41 and the second loading member 45 are detachably assembled with the housing 30. It is very convenient to assemble the polishers 200 with different style and size. The polishing apparatus 300 using the pressure detecting device 100 can monitor the pressures of the polisher 200 applied to the workpiece. Then the operators adjust the lengths of the elastic members in time to improve the quality of the polishing.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A pressure detection device, comprising:
a pressure detector;
a force transfer member connected with the pressure detector;
a bearing member;
at least two guiding rods passing through the bearing member and the force transfer member; and
at least two elastic elements sleeving on the at least two guiding rods correspondingly and being located between the bearing member and the force transfer member for transferring forces to the pressure detector;
wherein the pressure detection device further comprises a bottom board, a top board, and a loading base, the bottom board defines a mounting hole, the top board is opposite to the bottom board; the at least two guiding rods connect the bottom board and the top board, and the pressure detector is mounted on the top board toward the bottom board, the loading base comprises a first loading member and a second loading member opposite to the first loading member, the first loading member and the second loading member pass through the mounting hole and resist the bottom board, the bearing member connects end surfaces of the first loading member and the second loading member.

2. The pressure detection device of claim 1, further comprising a sidewall, wherein the sidewall connects the top board and the bottom board.

3. The pressure detection device of claim 1, further comprising at least two buffering members passing through the bearing member, wherein each of the at least two guiding rods pass through a corresponding one of the at least two buffering members.

4. The pressure detection device of claim 3, further comprising at least two washers positioned on the at least two buffering members correspondingly, wherein each of the at least two washers sleeve on a corresponding one of the at least two guiding rods, and each of the at least two elastic elements are located between the pressure detector and a corresponding one of the at least two washers.

5. The pressure detection device of claim 1, wherein the first loading member comprises a first resisting portion and a first clamping portion extending perpendicularly from a bottom portion of the first resisting portion, and the first resisting portion passes through the mounting hole and resists the bottom board.

6. The pressure detection device of claim 5, wherein the second loading member comprises a second resisting portion and a second clamping portion detachably connecting with the second resisting portion, and the second resisting portion passes through the mounting hole and resists the bottom board.

7. The pressure detection device of claim 6, wherein a first clamping port is defined in the first clamping portion, a second clamping port is defined in the second clamping portion, the first clamping port and the second clamping port cooperatively form a clamping space for receiving a polisher.

* * * * *